(12) United States Patent
McCallum et al.

(10) Patent No.: US 8,197,214 B2
(45) Date of Patent: Jun. 12, 2012

(54) COMPACT VARIABLE PITCH FAN

(75) Inventors: Jonathan Edwards McCallum, Edmonton (CA); George Antoszko, Edmonton (CA); Kevin John Dewar, Edmonton (CA); Andrew Louis Norell, St. Albert (CA); Cameron Dean Westbrook, Devon (CA); Terry Dean Nelson, Edmonton (CA); Brendan Anthony Romano, Sherwood Park (CA)

(73) Assignee: Flexxaire Manufacturing Inc., Edmonton (CA)

( * ) Notice: Subject to any disclaimer, the term of this patent is extended or adjusted under 35 U.S.C. 154(b) by 1048 days.

(21) Appl. No.: 12/111,922

(22) Filed: Apr. 29, 2008

(65) Prior Publication Data

US 2009/0196747 A1 Aug. 6, 2009

(51) Int. Cl.
*F04D 29/36* (2006.01)
(52) U.S. Cl. ....................................................... 416/167
(58) Field of Classification Search .................. 416/156, 416/157 R, 167, 168 R, 147, 159
See application file for complete search history.

(56) References Cited

U.S. PATENT DOCUMENTS

| 4,037,986 | A | 7/1977 | Chilman |
| 4,668,168 | A * | 5/1987 | Schilder et al. ........... 416/157 R |
| 6,109,871 | A | 8/2000 | Nelson et al. |
| 6,190,126 | B1 | 2/2001 | Haegele et al. |
| 6,439,850 | B1 | 8/2002 | McCallum et al. |
| 7,229,250 | B2 | 6/2007 | McCallum et al. |
| 2005/0100444 | A1* | 5/2005 | McCallum et al. .............. 416/1 |
| 2006/0280608 | A1 | 12/2006 | McCallum et al. |

FOREIGN PATENT DOCUMENTS

| DE | 19959893 A1 | 6/2001 |
| DE | 102004035631 A1 | 2/2006 |

* cited by examiner

*Primary Examiner* — Richard Edgar
(74) *Attorney, Agent, or Firm* — Christensen O'Connor Johnson Kindness PLLC

(57) ABSTRACT

A compact variable pitch fan has a hydraulic pitch change mechanism. A pitch change piston is constrained to follow reciprocating motion under hydraulic control within a peripheral hub from which fan blades extend outward. An additional feature is the use of separated guiding and seal surfaces. A still further feature is the use of a pitch sensor, particularly on the hydraulic line leading to the variable pitch fan.

13 Claims, 7 Drawing Sheets

COMPACT VARIABLE PITCH FAN

BACKGROUND

Flexxaire Manufacturing Inc. of Edmonton, Canada, manufactures a hydraulically controlled fan, and a pneumatically controlled fan. The pneumatic fan uses a single acting spring return piston, and the hydraulic fan uses a double acting piston. Examples of these fans are shown in FIGS. 1 and 2 of U.S. Pat. No. 7,229,250 issued Jun. 12, 2007. The pneumatic fan (AX) has a compact construction, which suits many applications where space is limited on the equipment on which it is used. However, the hydraulic fan (FX) also has advantages due to the use of hydraulic fluid as the drive force for the pitch change mechanism. A combination of compact fan with hydraulic drive would be desirable, but the design poses engineering challenges.

SUMMARY

A compact variable pitch fan has a hydraulically driven pitch mechanism. An additional feature is the use of separated guiding and seal surfaces. A still further feature is the use of a pitch sensor, particularly on the hydraulic line leading to the variable pitch fan. These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Figure 1:
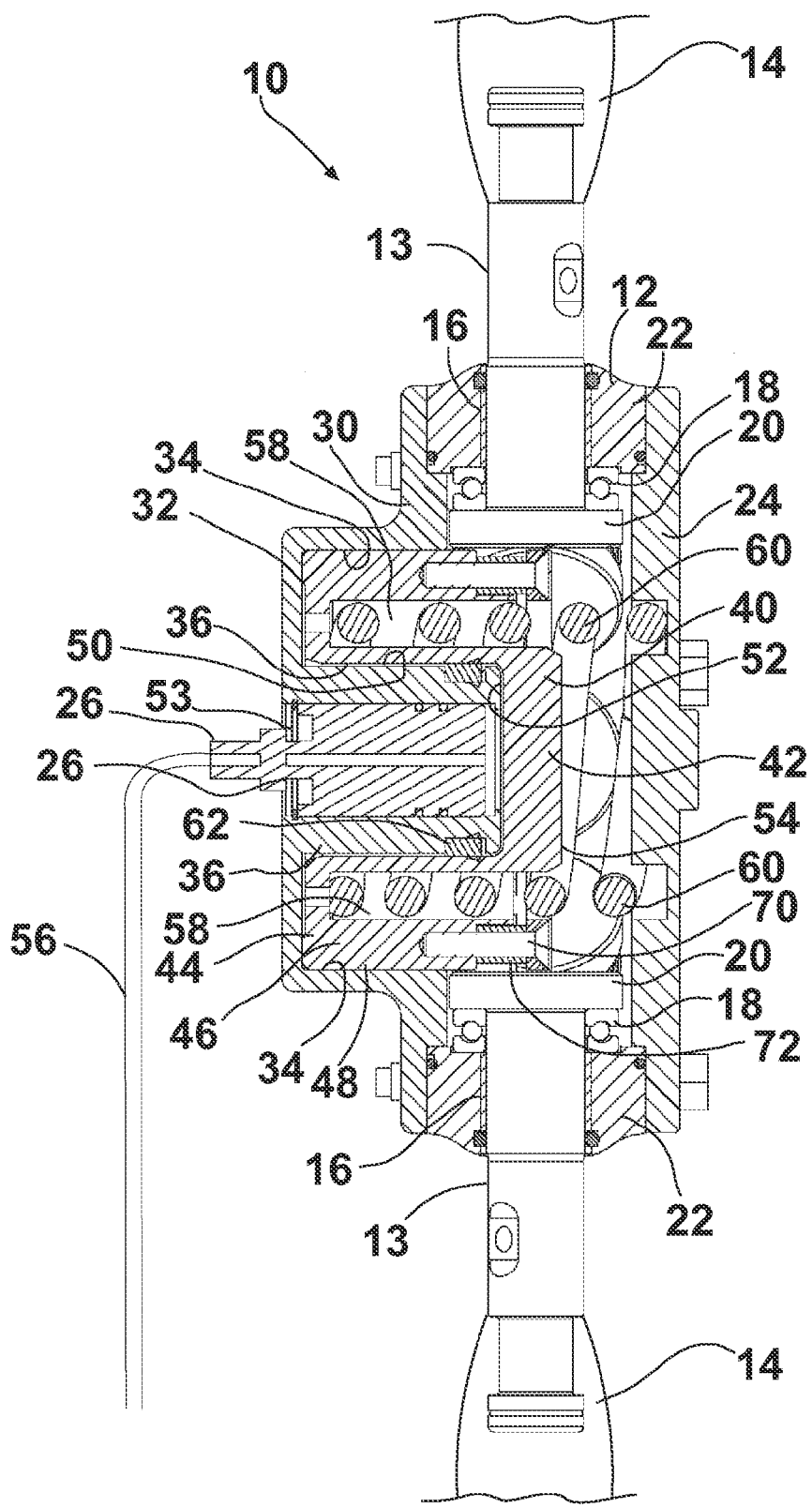
FIG. 1 is a section through a variable pitch fan showing a pitch change mechanism, with pitch change piston in a first operating position.

As shown in FIG. 1, a variable pitch fan 10 has a peripheral hub 12 in which blade shafts 13 of fan blades 14 are journalled and extend outward in conventional fashion. For each fan blade 14, a bushing 16 and bearings 18 allow the fan blade 14 to rotate at least partially around a radially extending axis passing through the fan blade 14. The fan blade 14 terminates radially inward in a fan blade connector piece 20. The fan blade 14 will typically rotate between normal and reverse pitch, and pass through a continuous range of possible positions between normal and reverse, including a neutral position in which the fan blades 14 are parallel to the plane of rotation of the fan blades 14. Attached to a back side 22 of the peripheral hub 12 by any suitable means is a back or mounting plate 24. The mounting plate 24 permits the variable pitch fan 10 to be mounted directly on a rotating part of an engine (not shown), typically of a piece of heavy machinery, so that the entire variable pitch fan rotates together, apart from a rotary union 26.

Figure 2:
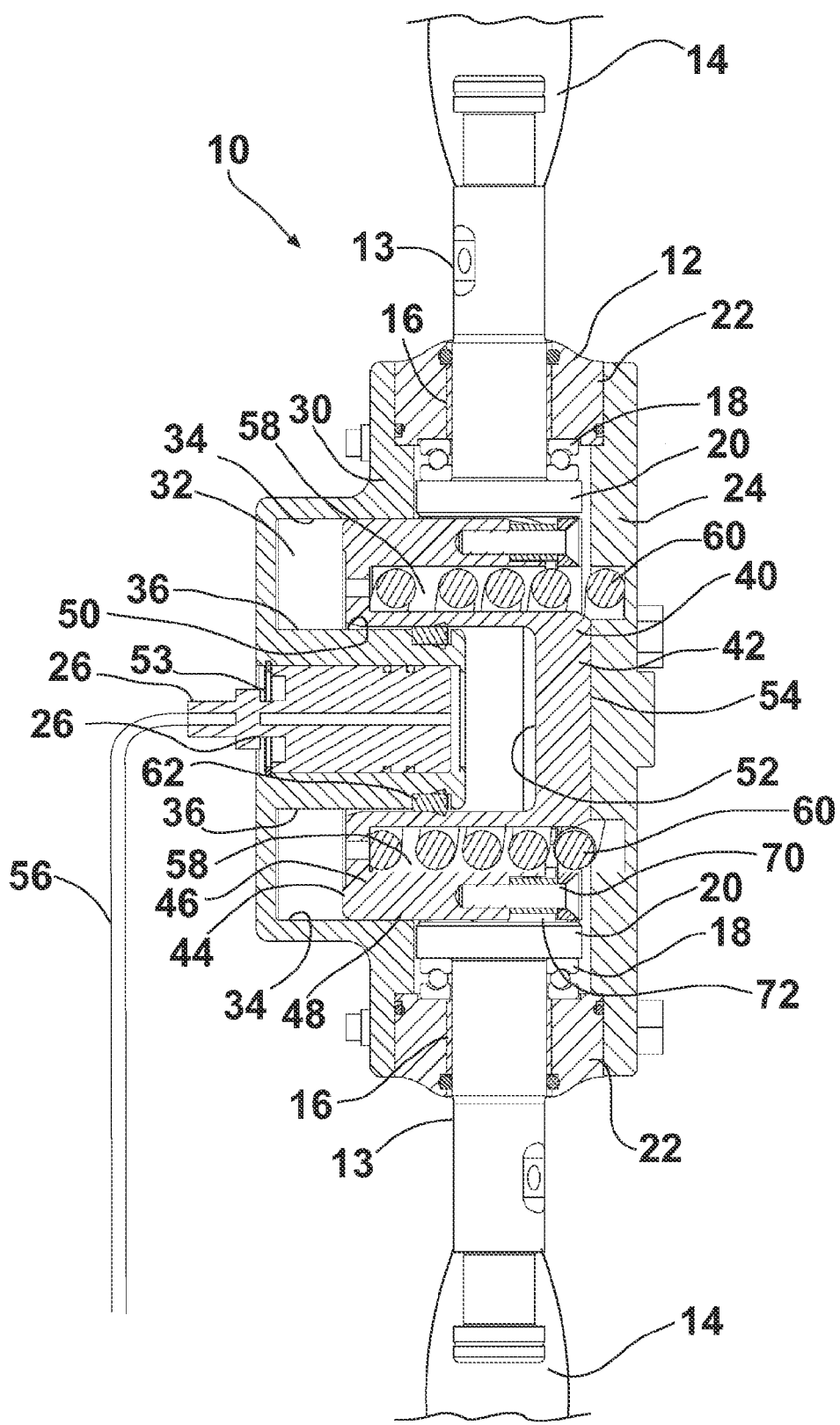
FIG. 2 is a section through a variable pitch fan showing a pitch change mechanism, with pitch change piston in a second operating position.

A front plate 30 is secured by any suitable means to the front side of the peripheral hub 10. One or more of the peripheral hub 12, mounting plate 24 and front plate 30 together form a housing that defines a cylinder having an annular cylinder portion 32 (seen better in FIG. 2). In the example shown, the peripheral hub 12, mounting plate 24 and front plate 30 all cooperate to define the cylinder, but this is not necessary. An outer cylindrical wall 34 of the front plate 30 and inner cylindrical wall 36 together form walls of the annular cylinder portion 32. A pitch change piston 40 is mounted within the cylinder. The pitch change piston 40 is closed at one end 42 and on its other end 44, which is received within the annular cylinder portion 32, there is an annular piston portion 46 formed between an outer piston wall 48 and an inner piston wall 50. Various drive configurations may be used to drive the pitch change piston 40. In the example shown, the pitch change piston 40 has a driven side 52 and a return side 54. While the parts 12, 24 and 30 together form a housing in this embodiment, other configurations of housing are possible, such as including changes of shape, configuration, orientation or number of parts.

The rotary union 26 is housed within the inner cylindrical wall 36, and provides a hydraulic supply to the driven side 52 of the pitch change piston 40. The rotary union 26 may be secured in place by any suitable means such as a spiral spring 53. In use, a hydraulic line 56 is connected to the rotary union 26. The hydraulic line 56 runs out to a hydraulic control system 100. The control system 100 may be designed according to the principles described in U.S. Pat. No. 7,229,250 issued Jun. 12, 2007. The rotary union 26, which is a commercially available part, such as a 6000 psi rotary union, is shown schematically, and will have conventional internal parts allowing the hydraulic line 56 to remain fixed, while the variable pitch fan 10 rotates. The annular piston portion 46 has an annular slot 58 on the return side 54 of the pitch change piston 40 in which lies a return spring 60. The return spring 60 presses up against the return side 54 of the pitch change piston 40 deep within the slot 58 and against the mounting plate 24 to bias the pitch change piston 40 to the front side of the variable pitch fan 10, as shown in FIG. 1, which may correspond to a normal blade position. Application of hydraulic fluid through the rotary union 26 into the space between the front plate 24 and the closed end 42 of the pitch change piston 40 urges the pitch change piston 40 against the force of the return spring 60 towards the position shown in FIG. 2, which may for example correspond to a reverse pitch position of the fan blades. A double acting piston could also be used as a return drive, but is not as simple to make as a return drive using a return spring 60.

The outer cylindrical wall 34 forms a guide surface or guiding wall for the pitch change piston 40. That is, the dimensions of the outer piston wall 48 and the inner cylindrical wall 34 are chosen so that the outer piston wall 48 fits as closely as possible to the inner cylindrical wall 34 while allowing motion of the pitch change piston 40 within the cylinder. To avoid damage to a seal along the guide surface, hydraulic fluid injected between the front plate 30 and closed end 42 of the pitch change piston 40 is prevented from migrating out of the cylinder by an annular seal 62 the inner cylindrical wall 36 and the inner piston wall 50. The annular seal 62 may be for example a U-seal.

Figure 4:
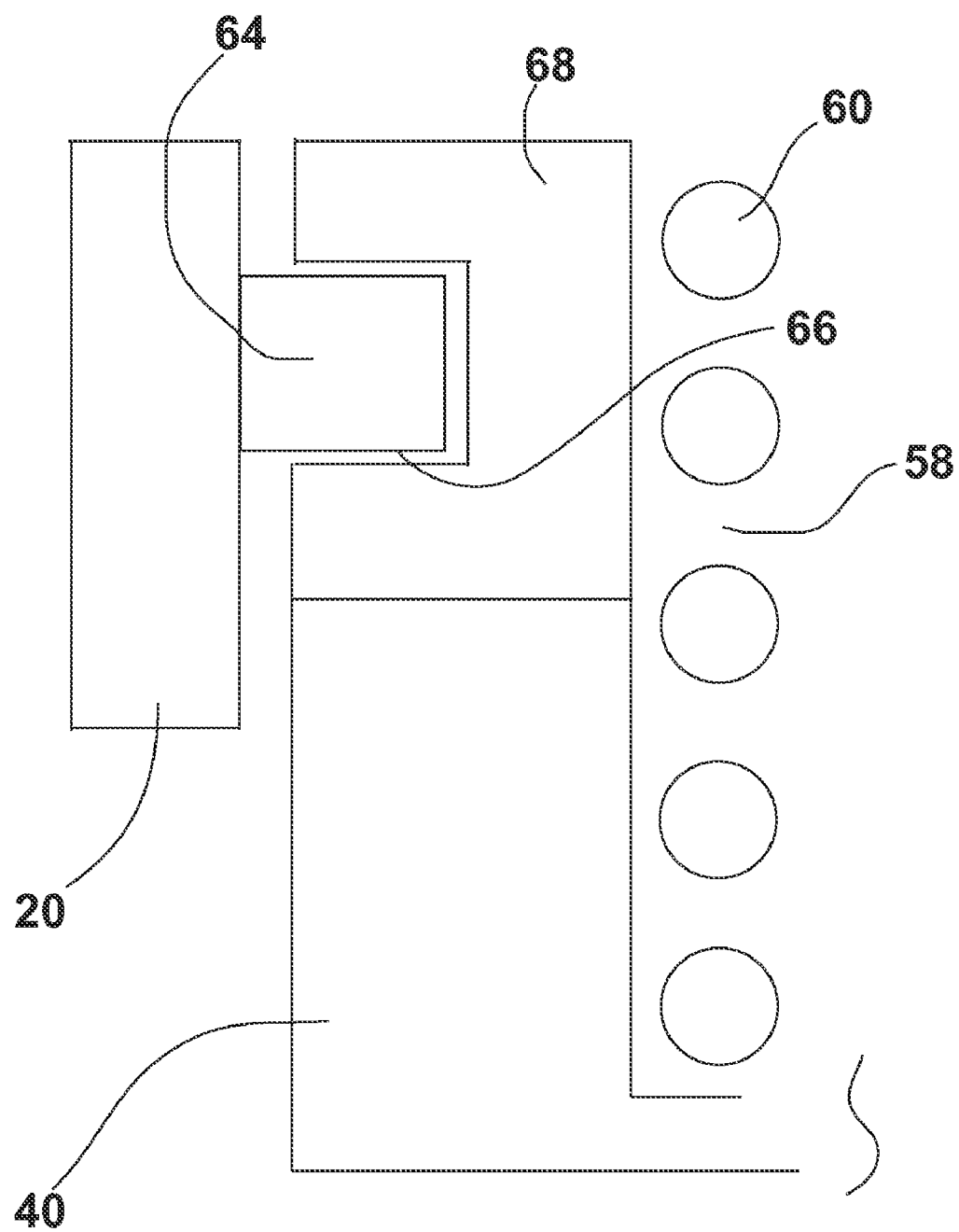
FIG. 4 is a section through a connecting block between pitch change piston and a fan blade.

As shown in FIG. 4, the pitch change piston 40 interconnects with the fan blades 14 to control pitch of the fan blades 14 by any suitable means, such as a pin 64 extending from the fan blade connector piece 20 into a receiving socket 66 in a shifter block 68 that forms part of the pitch change piston 40 and is secured to the other parts of the pitch change piston 40 by for example cap screws 70 and spacers 72.

In operation, the variable pitch fan 10 is in its normal operating position shown in FIG. 1 with the fan blades 14 in full normal pitch (corresponding to cooling). When a pitch change is desired, hydraulic fluid is pulsed through the rotary union 26 in an integral control scheme. Incrementally adding fluid in a series of pulses between the front plate 30 and closed end 42 of the pitch change piston 40 incrementally alters the pitch of the fan blades 14 towards full reverse thrust. Any desired operating position may be chosen depending on the amount of hydraulic fluid pulsed through the rotary union 26. For example, each pulse may corresponding to a pitch change of one degree. Other methods of changing pitch with flow of hydraulic fluid may also be used.

Figure 3:
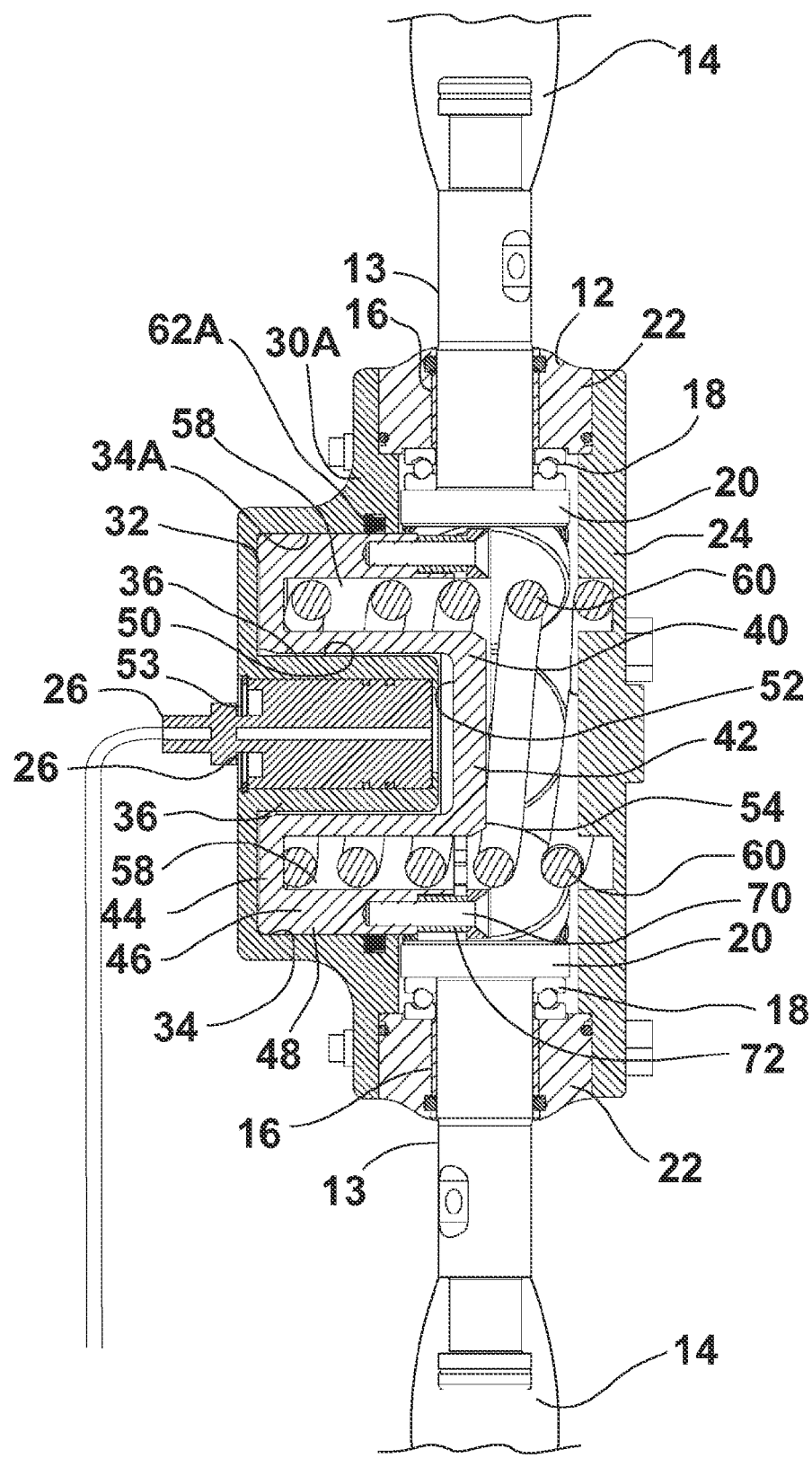
FIG. 3 is a section through another embodiment of a variable pitch fan.

A further embodiment of a variable pitch fan is shown in FIG. 3. In this embodiment, reference characters shared in common with reference characters of FIGS. 1 and 2 refer to the same parts, and the parts operate in the same manner in the two embodiments except as described in this paragraph. In the embodiment of FIG. 3, the front plate 30A replaces front plate 30 of FIGS. 1 and 2, seal 62A replaces the seal 62 of FIGS. 1 and 2 and guiding wall 34A replaces guiding wall 34 of FIGS. 1 and 2. Front plate 30A differs from front plate 30 by including an annular groove in the guiding wall 34A that holds seal 62A. In this embodiment, therefore, the seal 62A is in the exterior guiding wall 34A. While this design risks damage to the seal 62A, it has the added advantage of allowing for lower hydraulic pressure due to the larger diameter. There is a corresponding trade-off of increasing the amount of hydraulic fluid required, which may not be desired.

Figure 5:
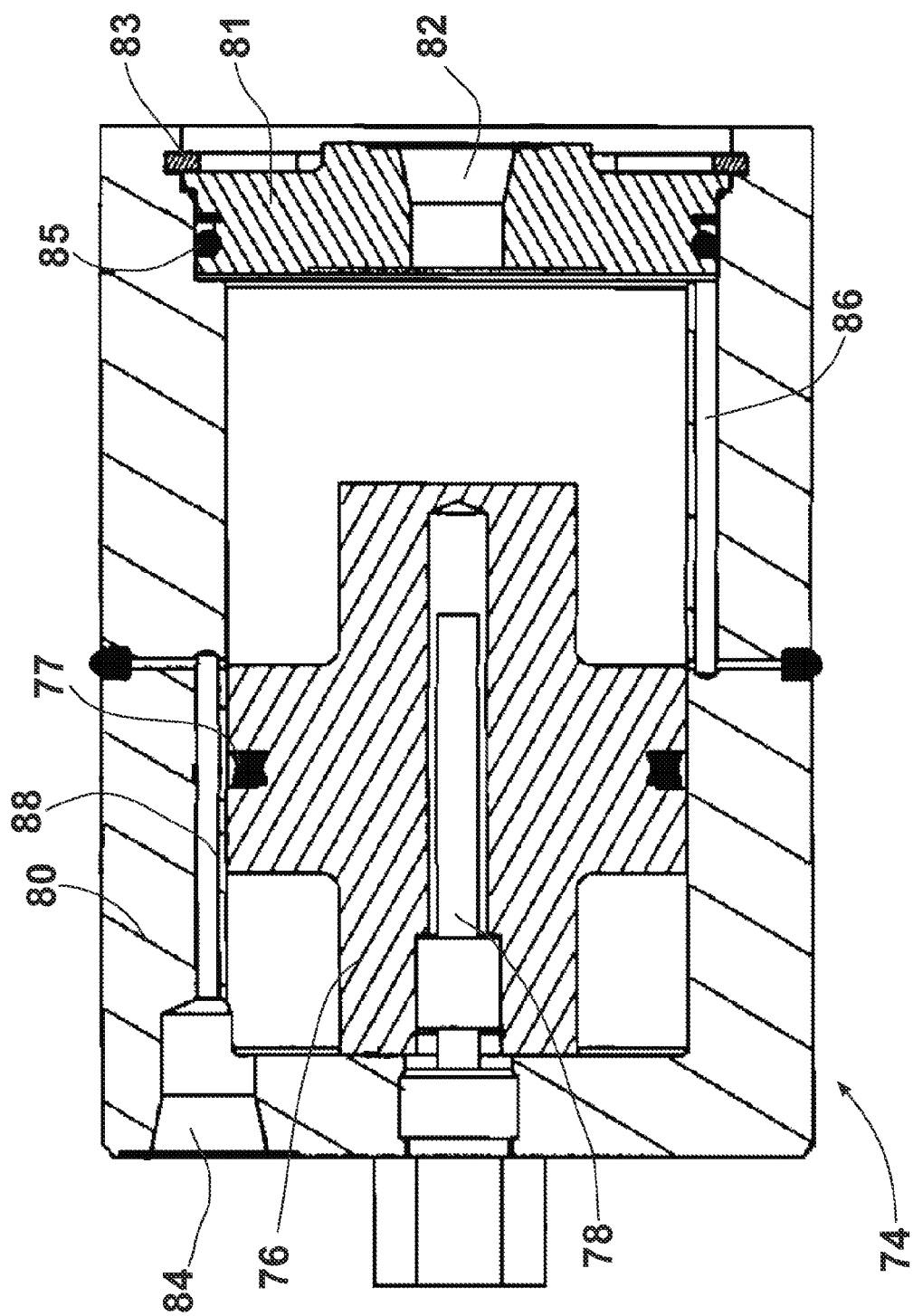
FIG. 5 is a section through a pitch sensor.
Figure 7:
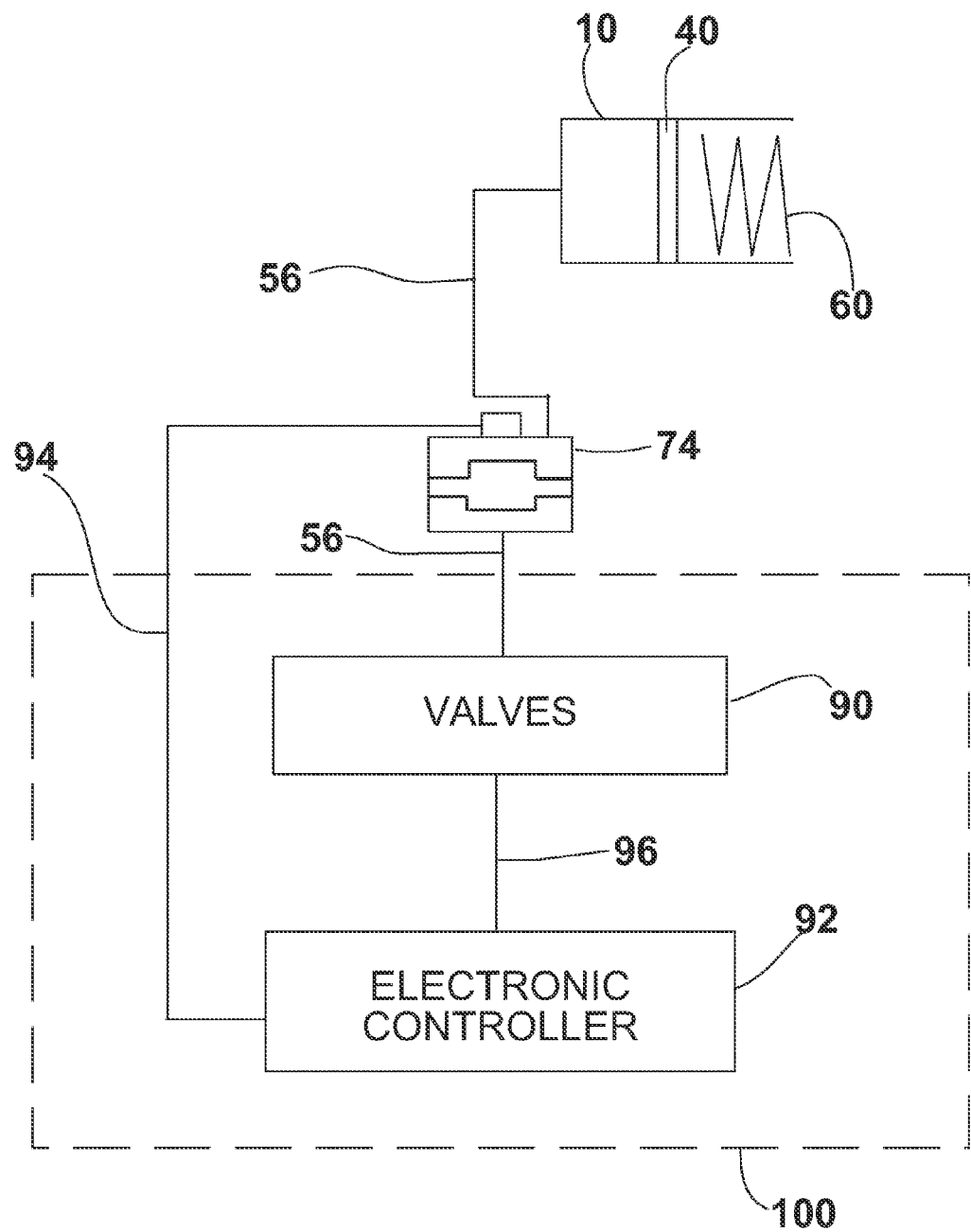
FIG. 7 shows an exemplary hydraulic control system.

During operation, it is sometimes useful to know the exact position of the fan blades 14. For example, after a purge, when the fan blades 14 are driven by hydraulic fluid into full reverse position, it may be desirable to return the fan blades 14 to the position that the fan blades 14 were in prior to the purge. A pitch sensor may be used for this purpose. In one embodiment shown in FIG. 5, a pitch sensor 74 may be located on the hydraulic supply line 56. The pitch sensor 74 generally comprises a sensor piston 76 coupled with the hydraulic supply 56 and having dimensions chosen to provide the sensor piston 76 with motion that is proportional to the movement of the pitch change piston 40. A potentiometer 78 or other suitable motion detecting device, such as an accelerometer or a magnet arrangement, detects motion of the sensor piston 76 and converts it to an electric signal that is sent to the hydraulic control system 100 (FIG. 7).

The sensor piston 76 is a floating piston mounted for reciprocal movement within a housing 80 and sealed by seal 77. A fluid inlet port 82 is provided on one end of the housing 80, and a fluid outlet port 84 is provided in the other end of the housing 80. The fluid inlet port 82 is formed in a plug 81 secured by a split ring 83 and sealed with seals 85. The ports 82 and 84 connect the pitch sensor 74 within the hydraulic line 56. A potentiometer 78 is fixed at one end of the housing 80 so that movement of the sensor piston 76 alters current flowing through the potentiometer and converts movement of the sensor piston 76 to an electric signal that can be sensed by the hydraulic control system 100. Spring or wave washers (not shown) may be provided on each end of the sensor piston 76 to initiate return motion of the sensor piston 76 after end of stroke has been reached.

Motion of the sensor piston 76 in one direction is induced by hydraulic fluid pulses from the hydraulic control system 100 and in the other direction by spring pressure from return spring 60. As the sensor piston 76 moves under pressure from fluid pulses, a situation may occur in which it may bottom out before the fan blades 14 are in full reverse pitch. For this reason, a fluid bypass port 86 is provided that is opened when the sensor piston 76 is close to the end of its stroke under pulsed fluid pressure. A similar bypass port 88 is provided for the like situation on the return stroke induced by pressure from spring 60. Various other methods may be used to provide the bypass function, as for example ports extending through the sensor piston 76.

As hydraulic fluid is pulsed into the pitch sensor 74, or driven into the pitch sensor 74 by the return spring 60, the potentiometer 78 or other displacement sensor converts the motion of the sensor piston 76 into an electrical signal that is sent to the hydraulic control system 100. With a linear relation between displacement of sensor piston 76 and fan blade pitch, the absolute pitch of the fan blades can be tracked from full normal to full reverse. The operator may then use the hydraulic control system 100 to select a pitch position by providing a known number of fluid pulses.

Figure 6:
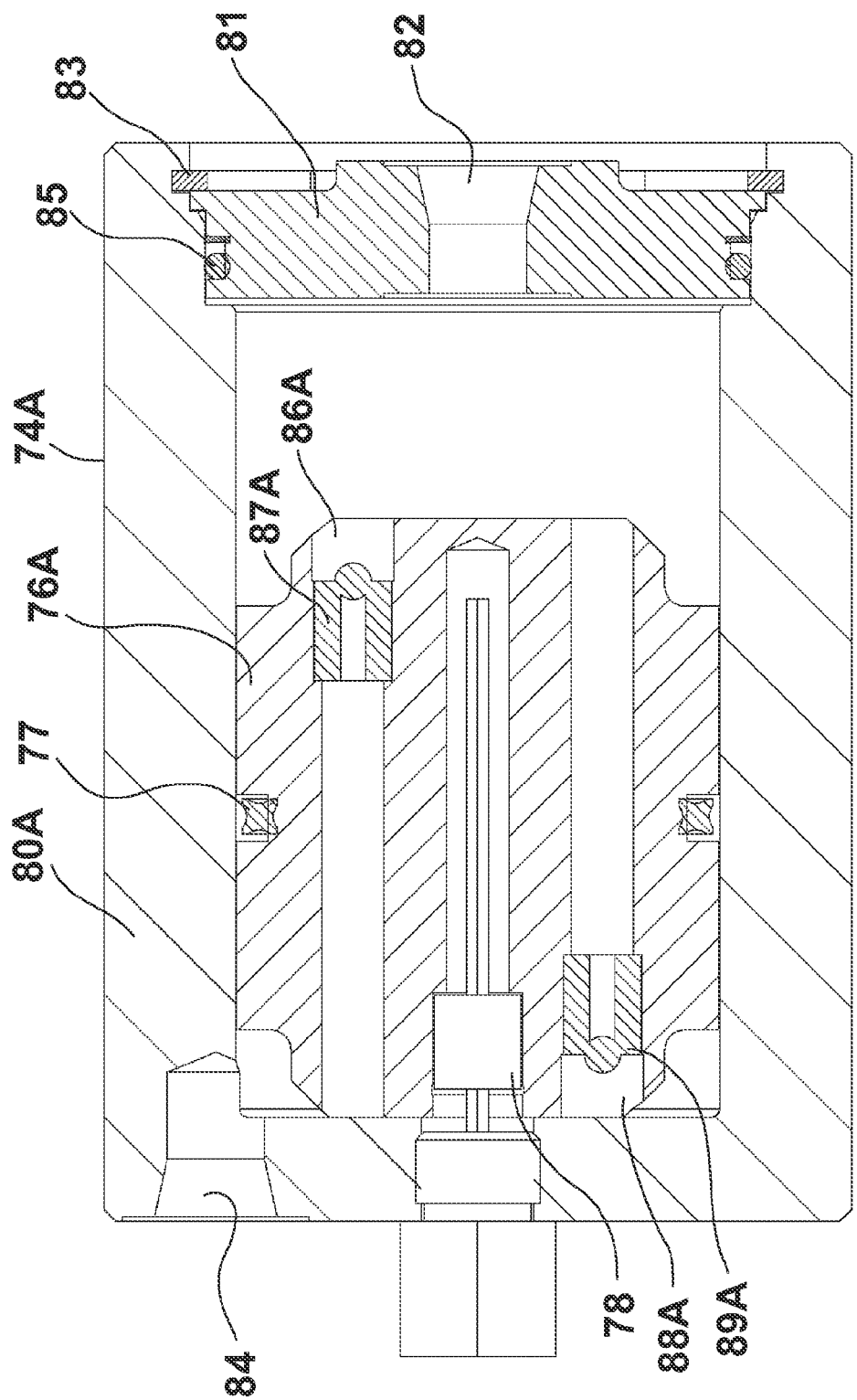
FIG. 6 is a section through another embodiment of a pitch sensor.

Another embodiment of a pitch sensor is shown in FIG. 6. Pitch sensor 74A is formed of a body 80A which is the same as the body 80 of the pitch sensor 74 except for the absence of by-pass ports 86 and 88. Elements 77, 78, 81, 82, 83, 84 and 85 in FIG. 6 are the same as the corresponding elements in FIG. 5. In FIG. 6, the piston 76A is modified to include by-pass ports 86A and 88A. By-pass port 86A includes a relief valve 87A set to open for example at some suitable level such as 10 psi, and by-pass port 88A includes a relief valve 89A set to open for example at 10 psi. The pitch sensor 74A works the same as pitch sensor 74 except as follows. In normal operation, since the piston 76A is free floating, there is very little differential pressure across the piston 76A. However, at end of stroke, as the piston 76A hits one of the end walls of the body 80A, the pressure on the driven side of the piston 76A increases and a corresponding one of the relief valves 87A or 89A opens to allow by-pass of fluid through the piston 76A. Thus, at end of stroke towards the right of FIG. 6, relief valve 87A opens, while at end of stroke towards the left of FIG. 6, relief valve 89A opens.

Referring to FIG. 7, an exemplary hydraulic control system 100 includes an electronic controller 92 and a valve or set of valves 90 that control fluid delivered to hydraulic line 56. The valves could be any of the configurations shown in FIGS. 3-11 of U.S. Pat. No. 7,229,250 or other suitable valves to achieve control of fluid to the variable pitch fan. The valves 90 deliver fluid pulses through line 56 and pitch sensor 74 (if used). Sensor signals from the pitch sensor 74 are sent back to controller 92 on line 94. The controller 92 can be a dedicated electronic device, or a virtual device: an existing programmable controller can be programmed to directly control the valves (i.e., the ECM-engine control module). There are a number of parameters that affect the cooling requirements of a machine, and therefore the required pitch of the fan. The types and numbers of parameters vary from machine to machine depending on which systems are cooled by the fan (i.e., Air conditioner condenser, hydraulic oil cooler, air to air after cooler, engine coolant etc.). Some machines have ECM's (electronic control modules) that already measure all of these parameters and this information can be tapped into. Some machines have fan speed outputs to control the speed of variable speed fans. This output takes into account all the appropriate parameters. Because of the variety, different types of control can be used.

There are a variety of inputs that can be used for the controller 92. These can be used individually, or in conjunction with each other, for example: A. The input may be an analog input such as temperature sensors (these are sensors that would be used exclusively by the fan control—i.e., they need to be installed with the control system) that could measure for example intake air temperature, coolant temperature, etc., pressure sensors (these are sensors that would be used exclusively by the fan control—i.e., they need to be installed with the control system), air pressure in fan control line or AC condenser core pressure. B. The input may be a control signal such as a PWM fan drive signal. Many engine manufacturers have programmed a PWM fan speed signal that is used on many hydraulic fan drives. This may be used to control the pitch by using an algorithm that converts this proportional signal to an integral signal—for example use a setpoint of 80% of fan speed. If you are below that, increase pitch, if you are above, decrease pitch. C. The input may be a digital input such as from temperature switches instead of temperature sensors, AC compressor input—a digital signal that indicates the AC compressor is running, a backup alarm input (to suppress purges), a fire suppression input, an operator input such as manual purge button, or ECM/Can bus inputs. ECM/Can bus inputs form a communication link. This allows data to be shared from other electronic devices eliminating the requirement for redundant sensors. For example, most ECM's monitor engine temperature. By connecting to the ECM, the control system would not need its own dedicated engine temperature sensor. Other digital inputs include a J1939 Can interface (or the diagnostic port) to capture sensor data, a direct ECM interface, other controllers existing on the equipment on which the fan is used, an IQAN hydraulic controller, or a transmission controller.

The outputs of the controller 92 may include 2 or 3 digital solenoid driver outputs (depending on the valve configuration) and an optional digital output to indicate when the fan is purging (i.e., connect a dash light to the controller). The controller can either be a virtual device (a program running on an existing programmable controller) or a dedicated electronic device. It will determine the pitch requirements by looking at sensor data. The sensor data may be obtained directly by the controller 92, or may be communicated to the controller by another electronic device, such as the pitch sensor 74 along one or more lines 94. The controller will then adjust the pitch of the fan by pulsing the appropriate valves, by sending signals along conventional connectors 96, as for example according to the principles of operation described in U.S. Pat. No. 7,229,250, but other methods could be used. Variations of the control system will be applicable to some machines where as other variations will be applicable to others: Large OEMS (for example Caterpillar) will use the virtual controller to save cost and complexity, where as smaller OEM's may not have the capability to reprogram an engine ECM, and will therefore require a separate device.

Immaterial modifications may be made to the embodiments described here without departing from what is covered by the claims.

What is claimed is:

1. A variable pitch fan, comprising:
a peripheral hub having a front side and a back side;
a mounting plate on the back side of the peripheral hub;
fan blades extending radially outward from the peripheral hub;
a front plate on the front side of the peripheral hub;
one or more of the peripheral hub, mounting plate and front plate defining a cylinder having an annular cylinder portion;
the annular cylinder portion having an outer cylindrical wall and an inner cylindrical wall;
a pitch change piston mounted within the cylinder, the pitch change piston having an annular piston portion with an outer piston wall and an inner piston wall, the pitch change piston having a driven side and a return side;
the pitch change piston interconnecting with the fan blades to control pitch of the fan blades;
the outer cylindrical wall forming a guide surface for the pitch change piston;
an annular seal between the inner cylindrical wall and the inner piston wall;
a rotary union housed within the inner cylindrical wall, the rotary union providing a hydraulic supply to the driven side of the pitch change piston; and
a piston return drive on the return side of the pitch change piston.

2. The variable pitch fan of claim 1 in which the piston return drive is a spring.

3. The variable pitch fan of claim 1 in which the hydraulic supply comprises a hydraulic line coupled to the rotary union.

4. The variable pitch fan of claim 3 further comprising a pitch sensor on the hydraulic supply.

5. The variable pitch fan of claim 4 in which the pitch sensor comprises a sensor piston coupled with the hydraulic supply and having dimensions chosen to provide the sensor piston with motion that is proportional to the movement of the pitch change piston.

6. A variable pitch fan, comprising:
a housing having a peripheral hub with fan blades extending radially outward from the peripheral hub, the peripheral hub surrounding a cylinder defined by walls of the housing, including a guiding wall,
a pitch change piston within the cylinder and guided by the guiding wall, the pitch change piston having a driven side and a return side, the pitch change piston interconnecting with the fan blades to control pitch of the fan blades, and the pitch change piston having an annular piston portion with an inner portion wall;
a rotary union in a wall of the housing, the rotary union providing a hydraulic supply for at least the driven side of the pitch change piston;
the walls of the housing including the guiding wall forming an annular cylinder portion, the annular cylinder portion including an inner cylinder wall opposed to the guiding wall; and
a seal provided between the inner piston wall and the inner cylindrical wall.

7. The variable pitch fan of claim 6 in which the driven side of the pitch change piston is driven by a spring.

8. The variable pitch fan of claim 6 in which the hydraulic supply comprises a hydraulic line coupled to the rotary union.

9. The variable pitch fan of claim 8 further comprising a pitch sensor on the hydraulic supply.

10. A variable pitch fan, comprising:
a housing having a peripheral hub with fan blades extending radially outward from the peripheral hub, the peripheral hub surrounding a cylinder defined by walls of the housing, including a guiding wall;
a pitch change piston within the cylinder and guided by the guiding wall, the pitch change piston having a driven side and a return side, and the pitch change piston interconnecting with the fan blades to control pitch of the fan blades;

a rotary union in a wall of the housing, the rotary union providing a hydraulic supply for at least the driven side of the pitch change piston, the hydraulic supply including a hydraulic line coupled to the rotary union; and a pitch sensor on the hydraulic supply, the pitch sensor comprising a sensor piston coupled with the hydraulic supply and having dimensions chosen to provide the sensor piston with motion that is proportional to the movement of the pitch change piston.

11. A variable pitch fan, comprising:

a housing having a peripheral hub with fan blades extending radially outward from the peripheral hub;

a cylinder defined by walls of the housing, including a guiding wall, the peripheral hub surrounding the cylinder;

a pitch change piston within the cylinder and guided by the guiding wall, the pitch change piston having a driven side and a return side, the pitch change piston interconnecting with the fan blades to control pitch of the fan blades;

a rotary union in a wall of the housing, the rotary union providing a hydraulic supply for at least the driven side of the pitch change piston;

a pitch sensor on the hydraulic supply;

a sensor cylinder and sensor piston coupled with the hydraulic supply, the sensor piston being responsive to fluid motion in the hydraulic supply, the sensor cylinder and sensor piston having dimensions chosen to provide the sensor piston with motion that is proportional to the movement of the pitch change piston; and a displacement to electric signal converter sensitive to motion of the piston.

12. The variable pitch fan of claim 11 in which the sensor piston has an input side and an output side and the hydraulic supply is connected to the sensor cylinder at an input port on the input side of the sensor piston and at an output port on the output side of the sensor piston.

13. The variable pitch fan of claim 11 in which the pitch sensor comprises:

the sensor piston having a first end of stroke position and a second end of stroke position; and bypass ports on the sensor cylinder that are opened when the sensor piston reaches either of the first end of stroke position or the second end of stroke position.

* * * * *

UNITED STATES PATENT AND TRADEMARK OFFICE
CERTIFICATE OF CORRECTION

Page 1 of 1

PATENT NO. : 8,197,214 B2
APPLICATION NO. : 12/111922
DATED : June 12, 2012
INVENTOR(S) : McCallum et al.

It is certified that error appears in the above-identified patent and that said Letters Patent is hereby corrected as shown below:

| COLUMN | LINE | ERROR |
|---|---|---|
| (30) Title Pg. 1, col. 1 | Foreign Appln. Priority Data | Before the line beginning with "(51) Int. Cl." please insert:<br><br>--(30)   Foreign Application Priority Data<br>  Jan. 31, 2008   Canada   2616310-- |

Signed and Sealed this
Twenty-eighth Day of May, 2013

Teresa Stanek Rea
*Acting Director of the United States Patent and Trademark Office*